(12) United States Patent
Goodson et al.

(10) Patent No.: US 10,330,225 B2
(45) Date of Patent: Jun. 25, 2019

(54) LIGHTNING RESISTANT GAS TUBING SYSTEM

(71) Applicants: Mark Eugene Goodson, Denton, TX (US); David J. Icove, Knoxville, TN (US)

(72) Inventors: Mark Eugene Goodson, Denton, TX (US); David J. Icove, Knoxville, TN (US)

( * ) Notice: Subject to any disclaimer, the term of this patent is extended or adjusted under 35 U.S.C. 154(b) by 0 days.

(21) Appl. No.: 15/859,154

(22) Filed: Dec. 29, 2017

(65) Prior Publication Data

US 2018/0216759 A1 Aug. 2, 2018

Related U.S. Application Data

(60) Provisional application No. 62/451,678, filed on Jan. 28, 2017.

(51) Int. Cl.

| | |
|---|---|
| *F16L 11/118* | (2006.01) |
| *F16L 5/10* | (2006.01) |
| *F17D 5/08* | (2006.01) |
| *F16L 11/15* | (2006.01) |
| *F16L 25/01* | (2006.01) |
| *F16L 9/06* | (2006.01) |
| *F16L 19/04* | (2006.01) |
| *F16L 25/00* | (2006.01) |

(52) U.S. Cl.
CPC ............ *F16L 11/1185* (2013.01); *F16L 5/10* (2013.01); *F16L 11/15* (2013.01); *F16L 25/01* (2013.01); *F17D 5/08* (2013.01); *F16L 9/06* (2013.01); *F16L 19/041* (2013.01); *F16L 25/0036* (2013.01)

(58) Field of Classification Search
CPC .... G01R 31/04; G01R 31/025; G01R 31/045; G01R 31/026; G01R 31/041
USPC .......................................................... 324/538
See application file for complete search history.

(56) References Cited

U.S. PATENT DOCUMENTS

| | | | | |
|---|---|---|---|---|
| 2,057,093 A | * | 10/1936 | Geisslinger | ............ H01H 73/56 335/141 |
| 2,352,556 A | * | 6/1944 | Matthews | ............... H01H 75/04 361/104 |
| 2,526,370 A | * | 10/1950 | Kott | ........................ H01H 85/44 313/325 |

(Continued)

*Primary Examiner* — Christopher P McAndrew
(74) *Attorney, Agent, or Firm* — Knox Patents; Thomas A. Kulaga

(57) ABSTRACT

Apparatus for detecting an electrical insult to a gas tubing system and dissipating the energy from such insult. The system includes tubing, at least one terminating connector, and an injury mitigator. The tubing includes a conduit, an insulating layer, a conductive layer, and a jacket. The conduit is connected to earth ground. The conductive layer is electrically insulated from the conduit by the insulating layer. The mitigator includes an insult event detection circuit and an energy dissipation circuit, both electrically connected between the conductive layer of the tubing and ground. Insult indication is provided by a fusible link. Energy dissipation is provided by the fuse, a transient voltage suppression (TVS) device, and/or a spark gap. The TVS device has a setpoint voltage less than the breakdown voltage of the spark gap, ensuring that the TVS device actuates before the spark gap conducts.

20 Claims, 3 Drawing Sheets

(56) References Cited

U.S. PATENT DOCUMENTS

| | | | | |
|---|---|---|---|---|
| 3,167,018 | A * | 1/1965 | Brunner | F42C 19/06 |
| | | | | 102/262 |
| 3,501,731 | A * | 3/1970 | Patterson | H01H 85/042 |
| | | | | 337/177 |
| 4,390,826 | A * | 6/1983 | Erdman | D06F 37/304 |
| | | | | 318/400.17 |
| 4,408,562 | A * | 10/1983 | DeCamp | B05C 5/02 |
| | | | | 118/324 |
| 5,896,013 | A * | 4/1999 | Leskovec | H05B 41/18 |
| | | | | 315/171 |
| 6,298,134 | B1 * | 10/2001 | Curry | H02H 9/042 |
| | | | | 379/399.01 |
| 7,044,167 | B2 | 5/2006 | Rivest | |
| 7,562,448 | B2 | 7/2009 | Goodson | |
| 7,821,763 | B2 | 10/2010 | Goodson | |
| 2004/0024308 | A1 * | 2/2004 | Wickline | A61B 5/055 |
| | | | | 600/422 |
| 2007/0012472 | A1 * | 1/2007 | Goodson | F16L 25/01 |
| | | | | 174/127 |
| 2008/0266730 | A1 * | 10/2008 | Viborg | H01L 27/0288 |
| | | | | 361/56 |
| 2008/0285716 | A1 * | 11/2008 | Tang | H05G 1/10 |
| | | | | 378/112 |
| 2011/0095758 | A1 * | 4/2011 | Walsh | A61B 5/055 |
| | | | | 324/307 |
| 2012/0063054 | A1 * | 3/2012 | Burrows | F02P 9/007 |
| | | | | 361/256 |
| 2015/0022932 | A1 * | 1/2015 | Hasenoehrl | H02G 13/60 |
| | | | | 361/124 |
| 2016/0339547 | A1 * | 11/2016 | Duquette | F16L 9/147 |

\* cited by examiner

LIGHTNING RESISTANT GAS TUBING SYSTEM

CROSS-REFERENCE TO RELATED APPLICATIONS

This application claims the benefit of U.S. Provisional Application No. 62/451,678, filed Jan. 28, 2017.

STATEMENT REGARDING FEDERALLY SPONSORED RESEARCH OR DEVELOPMENT

Not Applicable

BACKGROUND

1. Field of Invention

This invention pertains to a tubing system that is resistant to lightning strikes. More particularly, this invention pertains to gas tubing that includes a conductive layer insulated from the fluid conduit, including connectors to the tubing.

2. Description of the Related Art

Corrugated stainless steel tubing (CSST) is a flexible, stainless steel pipe or conduit used to supply natural gas and propane in residential, commercial, and industrial structures. The tubing is routed inside structures between the walls and floors, under floors and/or above the ceiling. Oftentimes CSST is installed in places where it is not able to be visually inspected after construction is completed. In many cases where the CSST could be visible for inspection, the CSST is covered by insulation applied between joists, thereby covering the CSST and making visual inspection difficult.

Unlike black iron pipe, CSST is run in continuous lengths without joints and fittings every time the pipe changes direction. Another advantage of CSST is that it readily accommodates vibration and structural shifts. Despite the advantages of CSST, the tubing is susceptible to puncture by an electrical injury. When CSST is punctured, there is a risk of fire from the leaking gas or a risk of explosion from pooled or accumulated gas.

An electrical insult is an unwanted event in which an object receives an electrical charge or carries an electrical current. An electrical injury is damage caused by an electrical insult. One type of electrical injury is damage caused by an electrical current passing through the object where the current is greater than the object can carry without damage. Electrical insults often occur when a conductive object is exposed to a strong electromagnetic field or receives an electrical charge, such as from a lightning strike. Lightning produces radio frequency (RF) energy that is rich in harmonics, ranging from 100 kHz to 120 MHz.

Corrugated stainless steel tubing is conductive by nature. The tubing provides an electrical path inside the structure because of its metal structure. However, CSST is designed and constructed to safely carry gas, such as natural gas and propane. These metallic components are not known for their ability to carry electric current. To further compound matters, it is a common practice to treat pipe joints with Teflon tape or plumber's putty, both of which inhibit electrical conductivity. The Fuel Gas Code (NFPA 54) calls for above ground gas piping systems to be electrically continuous and bonded to the grounding system. The code provision also prohibits the use of gas piping as the grounding conductor or electrode. In order to prevent electric shock and eliminate the risk of sparks associated with the CSST being above ground potential, CSST should be bonded to ground.

Methods and devices have been developed to prevent electrically induced fires in gas tubing. For example, U.S. Pat. Nos. 7,562,448 and 7,821,763 describe a separate shunt layer of metallization that is electrically separated from the tubing. The shunt can be a wire or a mesh electrically that shunts the tubing. The shunt serves to keep the charge away from the stainless steel tubing, making the tubing less likely to fail when insulted electrically. The shunt is electrically tied at both ends of the tubing to the tubing fittings or connectors, but being a shunt, the outer conductive member is physically separated from the tubing along its length.

BRIEF SUMMARY

In one embodiment, a gas tubing system includes a length of tubing, a pair of connectors, and an electrical injury mitigator. The tubing is flexible and gas-tight. The tubing is terminated at each end with the connectors. The tubing connects a gas supply pipe to equipment requiring the gas supply. An example of such tubing is one that includes the features of corrugated stainless steel tubing (CSST), which is a flexible, metallic tubing suitable for carrying natural gas and propane and routing such fluid inside a structure, such as a residence or commercial building.

The tubing includes a conduit that forms a fluid connection between the gas supply pipe and the equipment requiring the gas supply. The conduit is electrically conductive and is enclosed from end to end with an insulator or insulating layer. Over the insulator is a conductive layer. In one embodiment, the conductive layer encloses the insulator and extends end to end along the length of the tubing. The conductive layer is electrically isolated from the conduit. In one embodiment, a sheath or jacket covers the conductive layer. The sheath is a second insulating layer that is abrasion resistant.

The tubing includes a pair of connectors at the terminal ends. Each connector includes a pipe coupler and conduit nut that cooperate to make a conductive, fluid-tight connection between the conduit and the connecting pipe. The conduit is electrically connected to ground through the pipe coupler and conduit nut. The pipe coupler and conduit nut define a first conductive portion of the connector. Each connector includes an insulating nut and shield nut that cooperate to make an electrical connection to the conductive layer of the tubing and electrically isolates that layer from the pipe coupler portion of the connector. In this way the conductive layer is isolated from ground, which is connected to the conduit. The insulating nut and the shield nut define a second conductive portion of the connector. The second conductive portion of the connector is electrically isolated, or insulated, from the first conductive portion of the connector.

In one embodiment, a spark gap is formed as part of the connector between the pipe coupler and conduit nut pair and the insulating nut and shield nut pair. The spark gap is defined by an air gap with a minimum distance between the two conductive portions of the connector. The spark gap is exposed such that an observer is able to determine the presence of any residue or damage resulting from the spark gap discharging energy from an electrical injury sustained by the tubing system.

The electrical injury mitigator includes an electrical insult event detection/indication circuit and an energy dissipation circuit that are in electrical communication between the two conductive portions of the connector. According to one embodiment, the tubing system includes an insult event detection/indication circuit that indicates if the system has been insulted by electricity. In this way the integrity of the tubing system can be determined without requiring visual inspection of the full length of the tubing. In one such embodiment, an indicator, such as a fuse or other device that provides indication of an overcurrent condition, is electrically connected in series between ground and an outer conductive sheath of the tubing. During an electrical insult, the device actuates from the overcurrent condition resulting from the insult. The indicator informs an observer of the insult without requiring that the full length of the tubing be inspected to determine if an insult occurred.

According to another embodiment, one or both ends of the tubing system includes an energy dissipation circuit for dissipating the electrical energy received by the tubing during an electrical insult. In this way the tubing is protected from damage by the insult. In various embodiments of the energy dissipation circuit of the mitigator, a fuse, a spark gap, and/or a transient voltage suppression (TVS) device is electrically connected between ground and an outer conductive sheath of the tubing. During an electrical insult when all devices are used, the fuse actuates first by conducting current from the conductive layer of the tubing to ground, the TVS device actuates next because it has a voltage setpoint less than the spark gap breakdown voltage. For the situation where the TVS device cannot dissipate the energy from the insult, the spark gap conducts, thereby passing the energy to ground. For the embodiment where the tubing system also includes an indication circuit, the indicator has a current carrying capacity that is less than the current required to actuate the TVS device and the spark gap. For example, a fast-blow, low current fuse will blow, providing indication after the injury that such an injury occurred.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

Apparatus for lightning resistant gas tubing is disclosed. The tubing system is generally indicated as 100. Various components are illustrated both generically and specifically in the figures and in the following description. For example, various embodiments of the transient voltage suppression (TVS) device 504 are discussed individually and separately to ensure clarity when describing the configuration of each embodiment of the TVS devices 504-A, 504-B, 504-C. The TVS 504, when referred to collectively, is referenced without the alphanumeric suffix.

Figure 1:
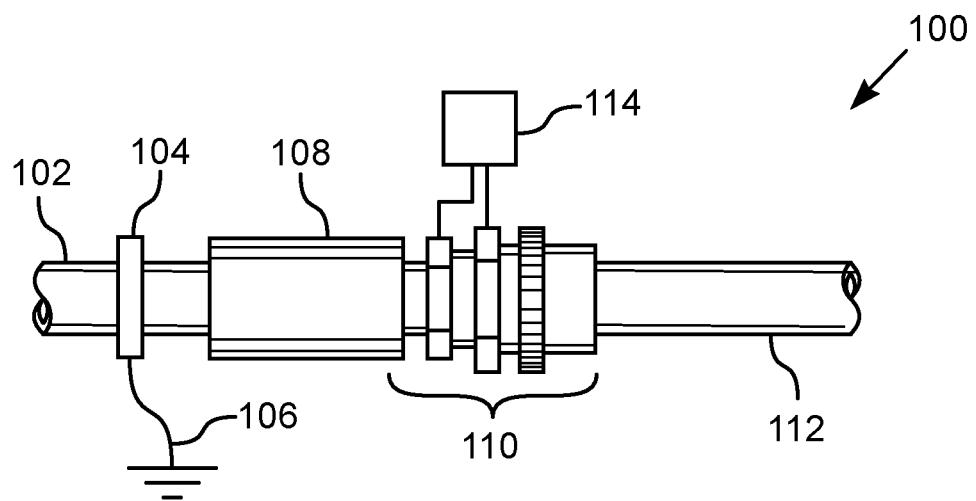
FIG. 1 is a partial side view of one embodiment of a supply pipe, a connector, and tubing.

FIG. 1 illustrates a partial side view of one embodiment of a supply pipe 102, a connector 110, and tubing 112. The tubing system 100 includes a length of tubing 112, at least one connector 110, and an electrical injury mitigator 114. In one embodiment, there is a connector 110 at each end of the tubing 112.

One end of the tubing system 100 is attached to a gas supply pipe or line 102. In various configurations the supply pipe 102 is black pipe carrying gas into a structure. The supply pipe 102 has a clamp 104 that is electrically connected to earth ground 106. The opposite end of the tubing system 100 (not illustrated) is connected to the equipment that receives the gas, such as an appliance or furnace. The opposite end of the tubing system 100 is substantially the same as the illustrated end of the system 100.

The connector 110 illustrated in FIG. 1 is coupled to a supply pipe 102 by way of a coupler 108. The connector 110 at the other end of the tubing 112 is coupled to a piece of equipment, such as an appliance or distribution manifold. A person of ordinary skill in the art will recognize that the portion of the connector 110 that is coupled to the supply line 102 and the piece of equipment will vary without departing from the scope of the invention. The illustrated connector 110 has a male threaded end that engages that coupler 108. In another embodiment, the connector 110 has a female end that engages the supply pipe 102.

Figure 2:
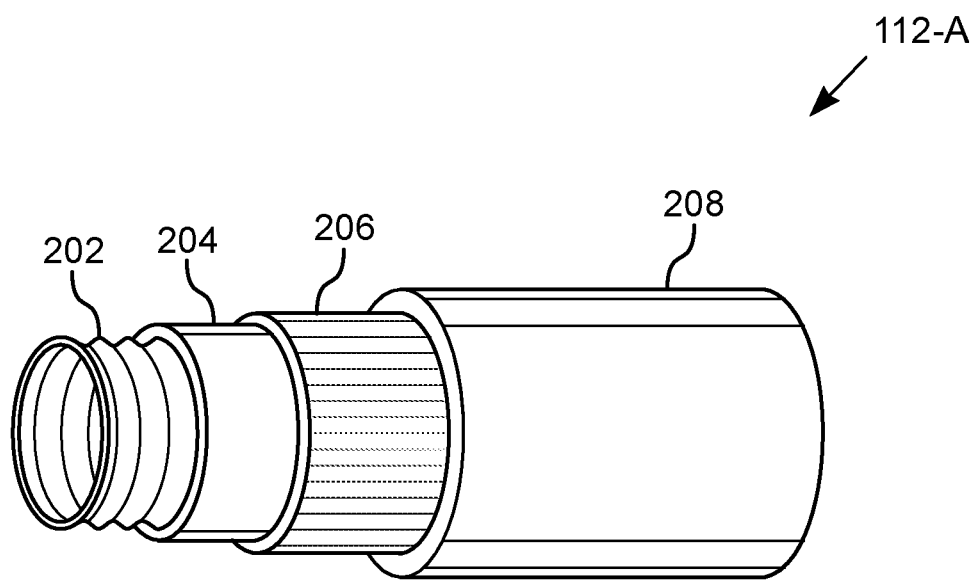
FIG. 2 is a perspective view of one embodiment of the tubing showing the various layers.

FIG. 2 illustrates a perspective view of one embodiment of the tubing 112-A showing the various layers 202, 204, 206, 208. The illustrated embodiment of the tubing 112-A is similar to a coaxial cable with a central, conductive core 202, a dielectric insulator 204, a conductive layer, or shield, 206, and an outer jacket 208.

The innermost layer is a conduit 202 that carries the pressurized gas. The conduit 202 is corrugated to allow the conduit 202 to flex and be bent without kinking. In one embodiment, the conduit 202 is stainless steel. In such an embodiment, the conduit 202 is bonded to the grounding system 106. In other embodiments, the conduit 202 is a flexible material that has similar properties as thin-wall corrugated stainless steel.

The second layer 204 is an insulator 204 that encapsulates the conduit 202. In one embodiment, the insulator 204 is a 0.125 inches thick layer of a polymer with a dielectric strength exceeding about 40 KV. In one embodiment, the insulator 204 is polyethylene (PE) with a thickness and dielectric strength of at least 30,000 volts. It is noted that the gas line integrity of the tubing 202 does not rely upon the layer 204 to be gastight.

The third layer 206 is a conductive layer 206. The conductive layer 206 is electrically isolated from the tubing 202. In various embodiments, the conductive layer 206 is a conductive foil, a conductive braid, a conductive mesh, or other conductive material that has sufficient conductivity and capacity to conduct the energy from an electrical insult to the connector 110, which is in electrical communication with earth ground 106.

The fourth layer 208 is a protective jacket for the inner layers 202, 204, 206. In various embodiments the jacket 208 is a polymer that is abrasion resistant and/or puncture resistant. The outer jacket 208 serves to make the tubing 112-A easy to pull over gusset plates and through drilled holes in lumber while being installed. In that the tubing 202 is corrugated, the outer jacket 208 smoothes out the profile of the tubing 112-A, allowing the tubing 112-A to be pulled through crevices in a structure without snagging on construction materials.

Figure 3:
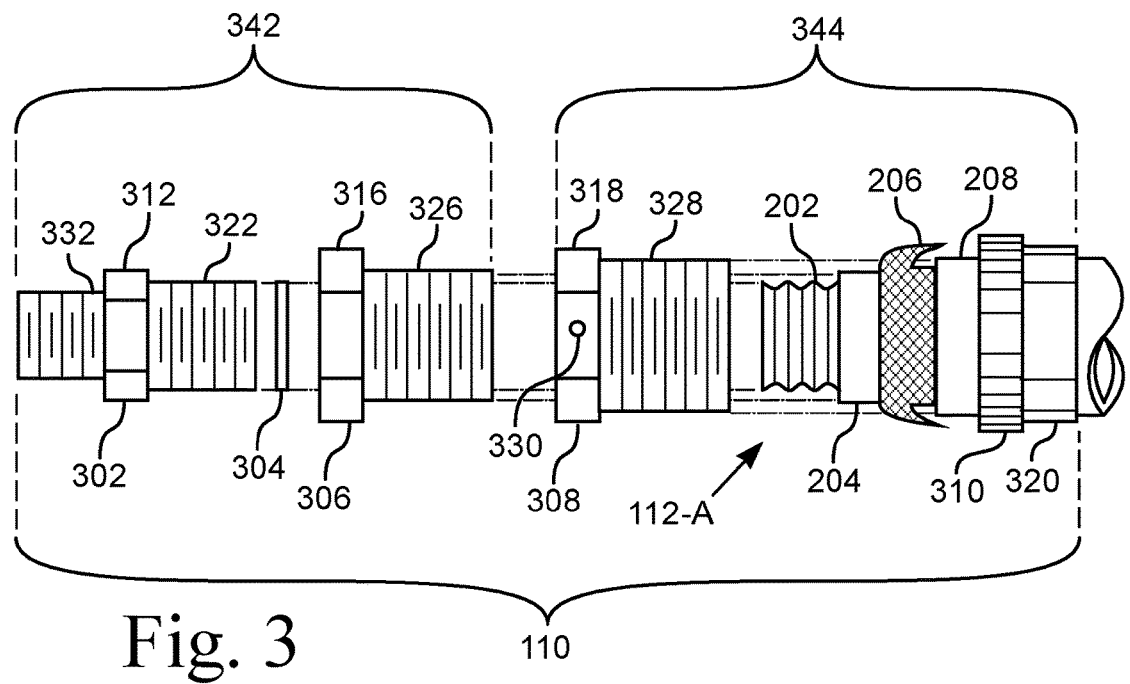
FIG. 3 is an exploded diagram showing one embodiment of the connector and an end of the tubing prepared to be attached to the connector.
Figure 4:
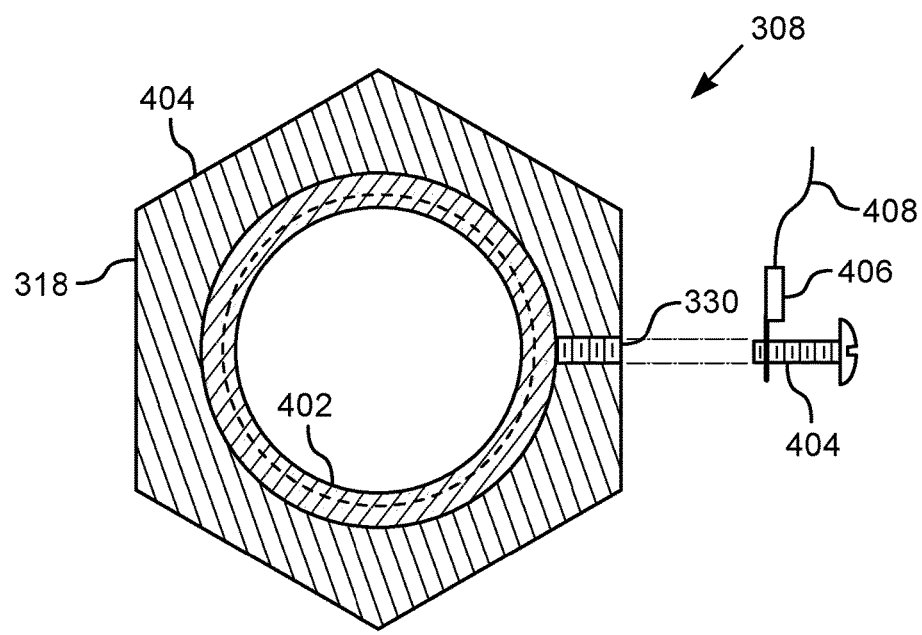
FIG. 4 is a cross-sectional view of one embodiment of the insulating nut.

FIG. 3 illustrates an exploded diagram showing one embodiment of the connector 110 and an end of the tubing 112-A prepared to be attached to the connector 110. FIG. 4 illustrates a cross-sectional view of one embodiment of the insulating nut 308. The illustrated connector 110 includes a pipe coupler 302, a supply clamp ring 304, a conduit nut 306, an insulating nut 308, and a shield nut 310. The illustrated embodiment of the connector 110 is similar to a coaxial cable connector where the inner conductor 202 is electrically connected to a first conductive portion 342 of the connector 110, which is electrically isolated from the shield conductor 206 that is electrically connected to a second conductive portion 344 of the connector 110.

The pipe coupler 302 portion of the connector 110 includes an outboard end 332, a hex portion 312, and a threaded end 322. The outboard end 332 is configured to mate with the supply pipe 102 or coupler 108. The threaded end 322 is configured to mate with the female threads inside the conduit nut 306. In various embodiments, the outboard end 332 has either a male thread, such as illustrated, or a female thread, or another type of coupling-half configured to mate with another coupling-half to make a gas-tight seal.

The clamp ring 304 is positioned in the last corrugation of the conduit 202 and secures the conduit 202 with a fluid-tight seal when the conduit nut 306 is secured to the pipe coupler 302. In the illustrated embodiment, the conduit 202 is secured in the pipe coupler 302 and conduit nut 306 in a conventional manner. Those skilled in the art will recognize that there may be other ways to form a gas-tight seal between the supply pipe 102 and the conduit 202.

The conduit nut 306 has a hex portion 316 and a threaded end 326. The threaded end 326 of the conduit nut 306 engages the female threads inside the insulating nut 308. The pipe coupler 302 and the conduit nut 306 define a first conductive portion 342 of the connector 110.

The insulating nut 308 has a hex portion 318, a threaded end 328, and an insert 402. The hex portion 318 and the threaded end 328 define an outer portion 404 of the insulating nut 308. The hex portion 318 includes a threaded opening 330 that receives a fastener 404 that secures a ring connector 406 that provides an electrical connection between the hex portion 318 and the electrical connection 408 to the mitigator 114. The threaded end 328 of the insulating nut 308 engages the female threads inside the shield nut 310. The electrical connection 408 to the hex portion 318 is in electrical communication with the conductive layer 206 through the hex portion 318 and threaded end 328. Those skilled in the art will recognize that the electrical connection 408 can be made to any device or component that is in electrical communication with the conductive layer 206 and the second conductive portion 344 of the connector 110.

The insert 402 has female threads that are configured to engage the male threads of the threaded end 326 of the conduit nut 306. The insert 402 is an insulator that electrically isolates the conduit nut 306 from the outer portion 404 of the insulating nut 308, which includes the hex portion 318 and the threaded end 328 of the insulating nut 308. In this way the conductive layer 206 is electrically isolated from the conduit 202 and the pipe coupler 302 and supply clamp ring 304. In one embodiment, the insert 402 is a polymer with a dielectric strength of at least 40,000 volts.

In one embodiment, the insert 402 has a radial thickness of 0.625 inches. The distance between the conductive portions of the insulating nut 308 proximate the conduit nut 306 thereby forms a spark gap 506 of ~0.625 inches. The end of the insulating nut 308 proximate the conduit nut 306 is visible such that an observer can see the end of the insert 402. In this way, any arcing across the gap 506 between the conduit nut 306 and the hex portion 318 of the insulating nut 308 is visible.

The shield nut 310 is knurled and has a barrel 320. Inside the shield nut 310 is a female thread configured to engage the threaded end 328 of the insulating nut 308. The conductive layer, or shield, 206 of the tubing 112-A is pushed back over the outer layer 208 such that the shield nut 310 secures the conductive layer 206 between the threaded end 328 of the insulating nut 308 and the shield nut 310. In one embodiment, the barrel 320 is crimped over the conductive layer 206, thereby making both an electrical and mechanical connection. In another embodiment, the conductive layer 206 is clamped between a surface of the shield nut 310 and the insulating nut 308, thereby making an electrical connection between the conductive layer 206 and the threaded end 328 of the insulating nut 308. The illustrated connection of the conductive layer 206 is similar to the way a shield of a coaxial cable is secured to a connector. The barrel 320 provides strain relief to the portion of the tubing 112-A extending away from the barrel 320. The outer portion 404 of the insulating nut 308 and the shield nut 310 define a second conductive portion 344 of the connector 110. The first conductive portion 342 of the connector 110 is insulated from the second conductive portion 344 of the connector 110 by the insulator 402 in the insulating nut 308.

A person skilled in the art will recognize that other styles of connectors 110 can be used to provide the features of the connector 100. The connector 110 forms a gas-tight seal between the pipe 102 and conduit 202. The connector 110 allows an electrical connection between the conduit 202 and an earth ground 106. The connector 110 isolates and insulates the conduit 202 from the conductive layer 206. The connector 110 accommodates an electrical connection 408 to the conductive layer 206.

Figure 5:
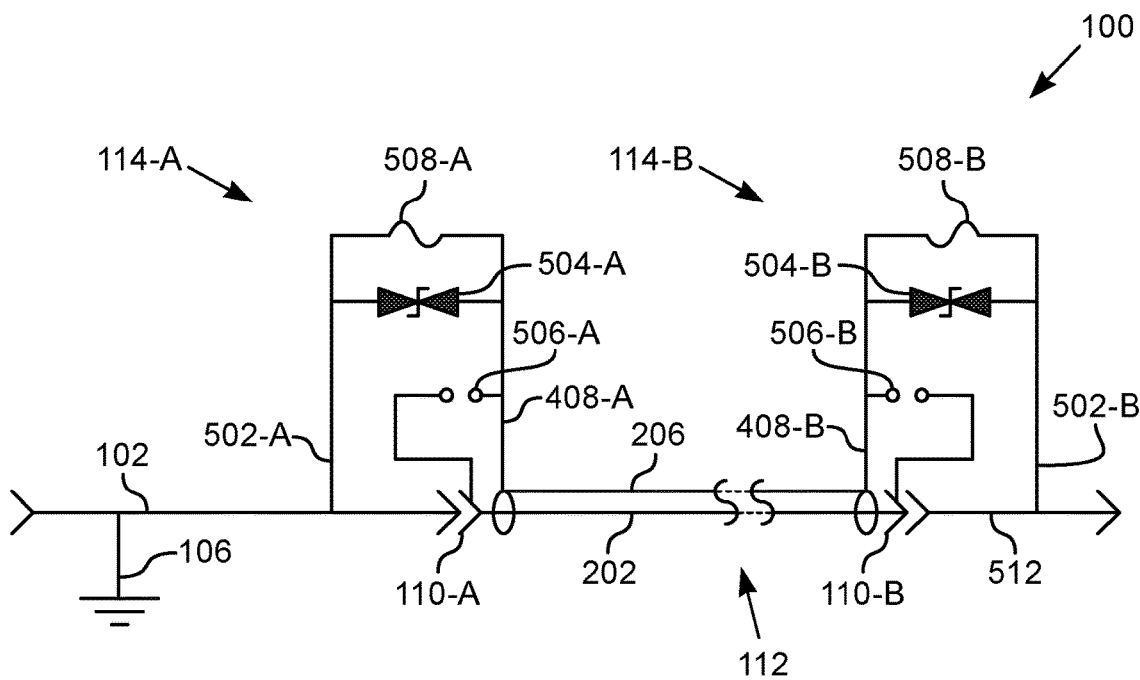
FIG. 5 is an electrical schematic of one embodiment of the tubing system.
Figure 6:
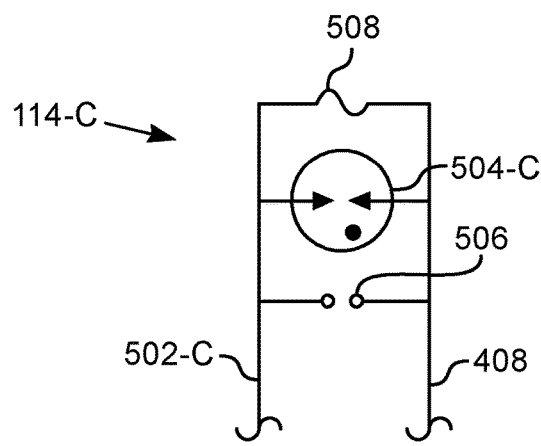
FIG. 6 is a electrical schematic of one embodiment of the injury mitigator showing a gas discharge device.

FIG. 5 illustrates an electrical schematic of one embodiment of the tubing system 100. FIG. 6 illustrates an electrical schematic of one embodiment of the injury mitigator 114-A that includes a gas discharge device 504-C as a transient voltage suppression device 504.

The tubing system 100 includes a length of tubing 112 with a first connector 110-A and a second connector 110-B. The first connector 110-A is associated with a supply end of the tubing 112 where the connector 110-A couples the tubing 112 to the supply pipe 102. The second connector 110-B is associated with an equipment end of the tubing 112 where the connector 110-B couples the tubing 112 to the equipment line 512, which, in various configurations, is a line directly feeding a piece of equipment, a distribution system feeding the equipment, or some other equipment that receives or requires gas.

FIG. 5 shows the supply pipe 102 electrically connected to an earth ground 106. The conduit 202 of the tubing 112 is electrically connected to the pipe 102 through the connector 110-A. The equipment pipe 512 electrically connected to the pipe 102 through the connectors 110-A, 110-B. A person of ordinary skill in the art will recognize that the electrical connection between the pipe 102 and earth ground 106 may be a direct connection or be routed or bonded through other equipment.

The conductive layer 206 of the tubing 112 extends from one connector 110-A to the other connector 110-B. The conductive layer 206 has a electrical connections 408-A, 408-B to the mitigators 114-A, 114-B. The spark gaps 506-A, 506-B are formed by an air gap between the first conductive portion 342 and the second conductive portion 344 of the corresponding connector 110-A, 110-B. The spark gaps 506-A, 506-B formed by the inserts 402 in each insulating nut 308 is electrically connected between the conductive layer 206 of the tubing 112 and the portion of each connector 110 that is electrically connected to ground 106. In one embodiment, the insulating layer 204 and the insulating insert 402 have a dielectric strength measured in the tens of thousands of volts, which is substantially greater than the 4,500 volt breakdown voltage of the spark gap 506. In this way, the spark gaps 506-A, 506-B will breakdown and conduct current before the insulating layer 204 or the insulating insert 402 breakdown, thereby ensuring that the charge on the conducting layer 206 is dissipated before the conduit 202 suffers injury from the electrical insult.

The illustrated embodiments of the mitigators 114-A, 114-B each include a spark gap 506-A, 506-B, a transient voltage suppression (TVS) device 504-A, 504-B, and a fuse 508-A, 508-B. The mitigator 114 is a device that mitigates or prevents injury to the integrity of the tubing 112 and connectors 110 from an electrical insult. In various embodiments, the mitigator 114 includes one or both of an indication circuit and an energy dissipation circuit. The indication circuit of the mitigator 114 includes a component that indicates if the system 100 has suffered an electrical insult. One embodiment of an indication circuit is a passive device such as a fuse 508 that provides visible indication that it has detected an electrical insult. For example, a fuse 508 that is a glass-barrel type with a rating of 10 amps and 250 volts will blow or interrupt the ground path when the system 100 suffers an electrical insult of sufficient intensity to generate enough current to ground to actuate or blow the fuse 508. The residue of the blown fuse 508 inside the glass barrel indicates that that the system 100 suffered an electrical insult. Another embodiment of an indication circuit is a passive device such as a thin wire that melts as a result of an electrical insult. The melted wire itself indicates the occurrence of an insult. In one such embodiment, the heat from the melting wire leaves visual indication on another material that is sensitive to the heat, such as a paper product.

The mitigator 114 also includes an energy dissipation circuit. In various embodiments, the energy dissipation circuit of the mitigator 114 includes one or more of a spark gap 506, a TVS 504 and/or a fuse 508. The TVS device 504 is an electrical component configured to react to sudden overvoltage conditions, such as would be caused by an electrical insult to the tubing system 100. FIG. 6 illustrates one embodiment of the injury mitigator 114-C where the TVS device 504 is a gas discharge tube or device 504-C. For other embodiments, the TVS device 504 is one or more of a metal-oxide varistor (MOV), a transient voltage suppression diode, Transorb, and/or thyrector. The mitigator 114-C has an electrical connection 408 to the second conductive portion 344 of the connector 110 and the conductive layer 206. The illustrated mitigator 114-C has another electrical connection 502-C to earth ground 106, such as by way of the first conductive portion 342 of the connector 110, which is electrically connected to the supply pipe 102.

The fuse 508 is an electrical device configured to break an electrical circuit upon an overcurrent condition. The fuse 508 actuates upon an electrical insult to the tubing system 100 that causes the conductive layer 206 to be at a higher potential than ground because the higher potential will cause current to flow through the fuse 508. One function of the fuse 508 is to conduct a portion of the enegy received by the conductive layer 206 to ground 106. The dissipation function of the fuse 508 operates only until the fuse 508 blows from an overcurrent condition, at which time the TVS 504 is relied upon to dissipate the energy received by the conductive layer 206.

Another function of the fuse 508 is to provide a visual indication that it has blown, such as would happen after the system 100 suffers an electrical injury. Generally, fuses actuate explosively and leave visible evidence of actuation. In various embodiments, the fuse 508 is a glass barrel fuse, a cartridge fuse with a mechanical blown fuse indicator, or other type of device that actuates during an electrical insult to the tubing system 100 and has a visible indication. In one such embodiment, the fuse 508 is a glass barrel fuse where the fuse wire leaves residue on the glass barrel after actuation. That residue is visible to an observer. In another such embodiment, the fuse is a thin insulated wire, for example, a wire with a colored enamel insulation, that melts, leaving behind a visible indication of a broken wire and/or a burned spot on a paper or other heat sensitive material. In this way, visual indication of an electrical insult to the tubing system 100 is provided without requiring that the tubing system 100 be visually inspected over its length. In various embodiments, the fuse 508 is replaceable after actuation.

In one embodiment, the tubing system 100 includes a single injury mitigator 114 associated with one of the two connectors 110. In such an embodiment, the mitigator 114 is positioned at either the end of the system 100 proximate the supply pipe 102 or the equipment to be supplied with gas. The connector 110 at the other end of the tubing 112 includes first and second conductive portions that are insulated from each other such that the conductive layer 206 is electrically insulated from the conduit 202 at that connector 110. In another embodiment, the tubing system 100 includes a pair of mitigators 114, one associated with each connector 110-A, 110-B. Each mitigator 114 includes, in various embodiments, one or more of a spark gap 506, a TVS 504 and/or a fuse 508.

Upon the system 100 being subjected to a potentially damaging electrical insult, the fuse 508 will blow when the current flowing from the conductive layer 206 to ground exceeds the fuse setpoint. The blown fuse 508 breaks the conductive path between the conductive layer 206 and earth ground 106, thereby allowing the conductive layer 206 to receive a charge that raises the voltage of the conductive layer 206. In one embodiment, the TVS device 504 has a setting less than the breakdown voltage of the spark gap 506-A, for example, the TVS device 504 has a breakdown voltage of several hundred volts as compared to the breakdown voltage of the spark gap 506 of thousands of volts. When the voltage on the conductive layer 206 exceeds the setpoint of the TVS device 504, the TVS device 504 will conduct the current to ground. In this way, the TVS device 504 dissipates the energy from an electrical insult to the tubing system 100. For insults within the capabilities of the TVS device 504, the TVS device 504 will dissipate the energy from the insult without damage to the tubing system 100. If the energy of the insult exceeds the capability of the TVS device 504, the voltage on the conductive layer 206 will continue to rise. When the voltage on the conductive layer 206 exceeds the breakdown voltage of the spark gap 506, the spark gap 506 will conduct, thereby dissipating the excess energy from the insult without damage to the system 100.

The tubing system 100 includes various functions. The function of indicating when the tubing system 100 has undergone an electrical insult is implemented, in one embodiment, by the fuse 508 that is placed in series with the tubing shield 206 and earth ground 106. In various embodiments, the fuse 508 is a discreet device or a thin wire configured to melt when exposed to an electrical insult.

The function of dissipating the initial energy from an electrical insult is implemented, in one embodiment, by the transient voltage suppression (TVS) device 504 that is placed in series with the tubing shield 206 and earth ground 106. In another embodiment, the function of dissipating the initial energy from an electrical insult is implemented by the fuse 508, which conducts current between the conductive layer 206 and ground 106 before the fuse 508 blows from an overcurrent condition.

The function of dissipating the energy from an electrical insult is implemented, in one embodiment, by a spark gap 506 between the first and second conductive portions 342, 344 of the connector 110.

In accordance with accepted drawing practices for electrical schematics, liberal use of straight lines and corners has been made in depicting the various components. Those skilled in the art recognize that field practice for the routing of components and conductors that handle high frequency (HF) energy makes use of transitions and connections that minimize both reflected energy and self inductance.

From the foregoing description, it will be recognized by those skilled in the art that a lightning resistant gas tubing system 100 has been provided. In various embodiments, the system 100 includes a mitigator 114 that includes one or more of a fuse 508, a TVS 504, and a spark gap 506, where the mitigator 114 is connected between the insulting layer 206 and earth ground 106. The mitigator 114 includes one or both of an indication circuit and an energy dissipation circuit. The indicator circuit provides an indicator, such as a fuse 508, that the system 100 has suffered an electrical insult. The energy dissipation circuit provides an electrical path for the energy from the insult to flow to ground 106.

In one embodiment, the system 100 is configured with a short length of tubing 112 with attached connectors 110-A, 110-B, such as would be used to connect to gas meters, grills, fireplaces, or other equipment requiring gas. In another embodiment, the system 100 is configured to include tubing 112 that is installed in a structure with the separate connectors 110-A. 110-B attached after the tubing 112 is in place.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for carrying a gas in an environment that is subject to an electrical insult, said apparatus comprising:
    a tubing having a first end and a second end, said tubing having a conduit, an insulating layer, and a conductive layer, said insulating layer enclosing said conduit between said first and second ends, said conductive layer extending between said first and second ends, said insulating layer electrically insulating said conduit from said conductive layer;
    a first connector attached to said first end, said first connector having a first connector portion and a second connector portion, said first connector portion making a sealed, fluid connection with said conduit, said second connector portion making an electrical connection with said conductive layer of said tubing, said first connector portion electrically insulated from said second connector portion in said first connector;
    an energy dissipation circuit electrically connected between said first and second connector portions of said first connector; and
    an indicator electrically connected between said first and second connector portions of said first connector, and said indicator providing indication that the electrical insult occurred.

2. The apparatus of claim 1 wherein said energy dissipation circuit includes a spark gap, and said spark gap defined by an air space between a conductive member of said first connector portion and a conductive member of said second connector portion.

3. The apparatus of claim 1 wherein said energy dissipation circuit includes a transient voltage suppression device.

4. The apparatus of claim 3 wherein said energy dissipation circuit further includes a spark gap, said spark gap having a breakdown voltage greater than an actuating voltage of said transient voltage suppression device.

5. The apparatus of claim 1 wherein said second connector portion includes an electrical connection for said energy dissipation circuit.

6. The apparatus of claim 1 further including a second connector attached to said second end, wherein said second connector has a first connector portion and a second connector portion, said first connector portion makes a sealed, fluid connection with said conduit, said second connector portion makes an electrical connection with said conductive layer of said tubing, and said first connector portion is electrically insulated from said second connector portion in said second connector.

7. An apparatus for carrying a gas in an environment that is subject to an electrical insult, said apparatus comprising:
    a tubing having a first end and a second end, said tubing having a conduit, an insulating layer, and a conductive layer, said insulating layer enclosing said conduit between said first and second ends, said conductive layer extending between said first and second ends, said insulating layer electrically insulating said conduit from said conductive layer;
    a pair of connectors including a first connector attached to said first end and a second connector attached to said second end, each one of said pair of connectors having a first connector portion and a second connector portion, said first connector portion making a sealed, fluid connection with said conduit, said second connector portion making an electrical connection with said conductive layer of said tubing, said first connector portion electrically insulated from said second connector portion; and
    an energy dissipation circuit electrically connected between said first and second connector portions of one of said pair of connectors, whereby a current induced in said conductive layer must flow through said energy dissipation circuit.

8. The apparatus of claim 7 wherein said energy dissipation circuit includes a spark gap, and said spark gap defined by a space between a conductive member of said first connector portion and a conductive member of said second connector portion.

9. The apparatus of claim 7 wherein said energy dissipation circuit includes a transient voltage suppression device.

10. The apparatus of claim 9 wherein said energy dissipation circuit further includes a spark gap, said spark gap having a breakdown voltage greater than an actuating voltage of said transient voltage suppression device.

11. The apparatus of claim 7 wherein said tubing further includes a jacket disposed outside said conductive layer, and said jacket being abrasion resistant and protective of said conductive layer.

12. The apparatus of claim 7 further including an indicator electrically connected between said first and second connector portions of one of said pair of connectors, and said indicator configured to provide indication that said tubing received the electrical insult.

13. An apparatus for carrying a gas in an environment that is subject to an electrical insult, said apparatus comprising:
 a tubing having a first end and a second end, said tubing having a conduit, an insulating layer, and a conductive layer, said insulating layer enclosing said conduit between said first and second ends, said conductive layer extending between said first and second ends, said insulating layer electrically insulating said conduit from said conductive layer;
 a pair of connectors including a first connector attached to said first end and a second connector attached to said second end, each one of said pair of connectors having a first connector portion and a second connector portion, said first connector portion making a sealed, fluid connection with said conduit, said second connector portion making an electrical connection with said conductive layer of said tubing, said first connector portion electrically insulated from said second connector portion; and
 an indicator electrically connected between said first and second connector portions of one of said pair of connectors, and said indicator configured to provide indication that said tubing received the electrical insult.

14. The apparatus of claim 13 wherein said indicator is a fuse sized to actuate during the electrical insult.

15. The apparatus of claim 13 wherein said indicator is a wire sized to melt during the electrical insult.

16. The apparatus of claim 13 further including an energy dissipation circuit electrically connected between said first and second connector portions of one of said pair of connectors.

17. The apparatus of claim 16 wherein said energy dissipation circuit includes a spark gap, and said spark gap defined by a space between a conductive member of said first connector portion and a conductive member of said second connector portion.

18. The apparatus of claim 16 wherein said energy dissipation circuit includes a transient voltage suppression device.

19. The apparatus of claim 18 wherein said energy dissipation circuit further includes a spark gap, said spark gap having a breakdown voltage greater than an actuating voltage of said transient voltage suppression device.

20. The apparatus of claim 13 wherein said tubing further includes a jacket disposed outside said conductive layer, and said jacket being abrasion resistant.

* * * * *